(12) United States Patent
Kitamura

(10) Patent No.: US 8,689,967 B2
(45) Date of Patent: Apr. 8, 2014

(54) BELT DRIVING DEVICE AND IMAGE FORMING APPARATUS

(71) Applicant: Oki Data Corporation, Tokyo (JP)

(72) Inventor: Makoto Kitamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/753,884

(22) Filed: Jan. 30, 2013

(65) Prior Publication Data

US 2013/0192959 A1    Aug. 1, 2013

(30) Foreign Application Priority Data

Jan. 30, 2012    (JP) ................................. 2012-016346

(51) Int. Cl.
*B65G 39/16*    (2006.01)
*B65G 15/64*    (2006.01)
*G03G 15/16*    (2006.01)
*B65H 5/02*    (2006.01)

(52) U.S. Cl.
CPC ............... *B65G 39/16* (2013.01); *B65G 15/64* (2013.01); *G03G 15/1615* (2013.01); *G03G 2215/00143* (2013.01); *G03G 2215/00151* (2013.01); *G03G 2215/00156* (2013.01); *G03G 2215/1623* (2013.01); *B65H 5/021* (2013.01)
USPC ............................. 198/806; 198/840; 399/165

(58) Field of Classification Search
CPC .... B65G 39/16; B65G 15/64; G03G 15/1615; G03G 2213/00143; B03G 2215/00151; B65H 5/021

USPC .......................... 198/806–808, 840; 399/165
See application file for complete search history.

(56) References Cited

U.S. PATENT DOCUMENTS

| | | | | | |
|---|---|---|---|---|---|
| 1,963,099 | A | * | 6/1934 | Robins | 198/808 |
| 2,569,419 | A | * | 9/1951 | Kendall | 198/808 |
| 3,972,414 | A | * | 8/1976 | Conrad | 198/808 |
| 6,053,832 | A | * | 4/2000 | Saito | 474/122 |
| 7,815,042 | B2 | * | 10/2010 | Oishi | 198/837 |
| 2006/0119029 | A1 | * | 6/2006 | Kitamura | 271/275 |
| 2007/0110471 | A1 | * | 5/2007 | Kitamura | 399/101 |
| 2011/0318048 | A1 | * | 12/2011 | Yasumoto | 399/101 |

FOREIGN PATENT DOCUMENTS

JP    2006-162659 A    6/2006

* cited by examiner

*Primary Examiner* — Mark A Deuble
(74) *Attorney, Agent, or Firm* — Muncy, Geissler, Olds & Lowe, P.C.

(57) ABSTRACT

A belt driving device that drives a belt includes a plurality of rollers, an endless belt tensioned on the plurality of rollers, a belt guide member that is mounted on at least one end of at least one roller of the plurality of rollers and that guides a side edge part of the belt, and a belt displacement device that is mounted on the same end of the one roller as the belt guide member in order to displace the side edge part of the belt in a direction away from the belt guide member. Wherein a portion of the belt displacement device is located on a downstream side of the belt guide member in a traveling direction of the belt, and the portion continuously contacts the side edge part of the belt.

15 Claims, 17 Drawing Sheets

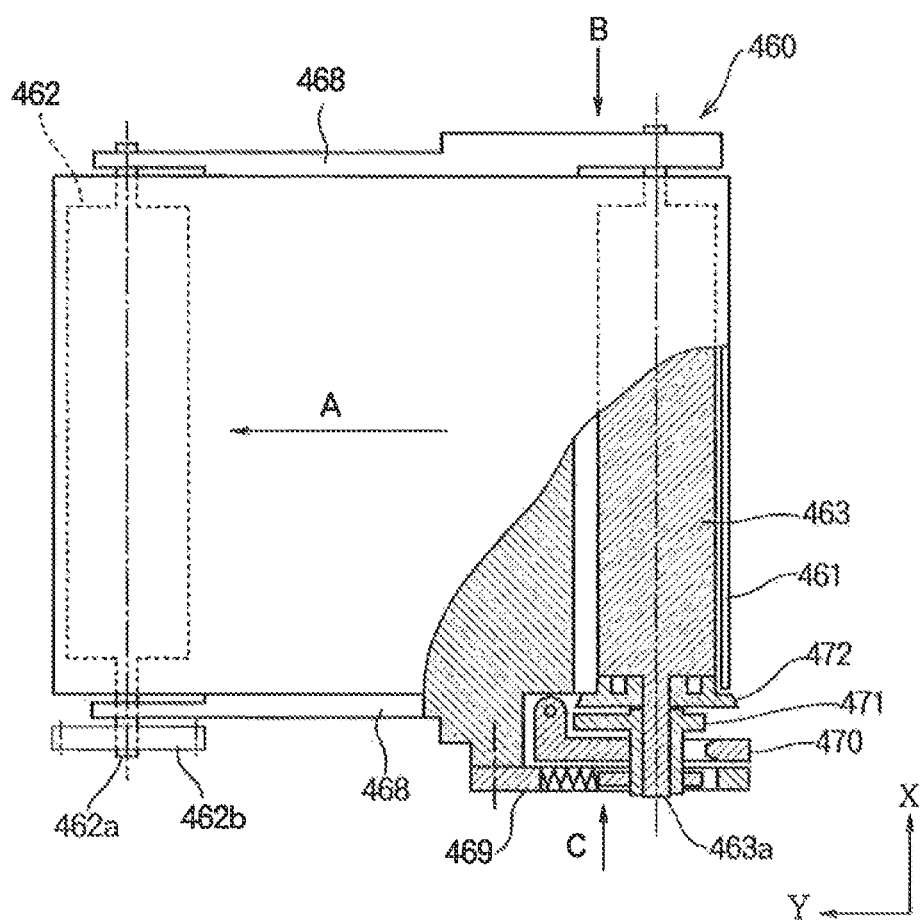

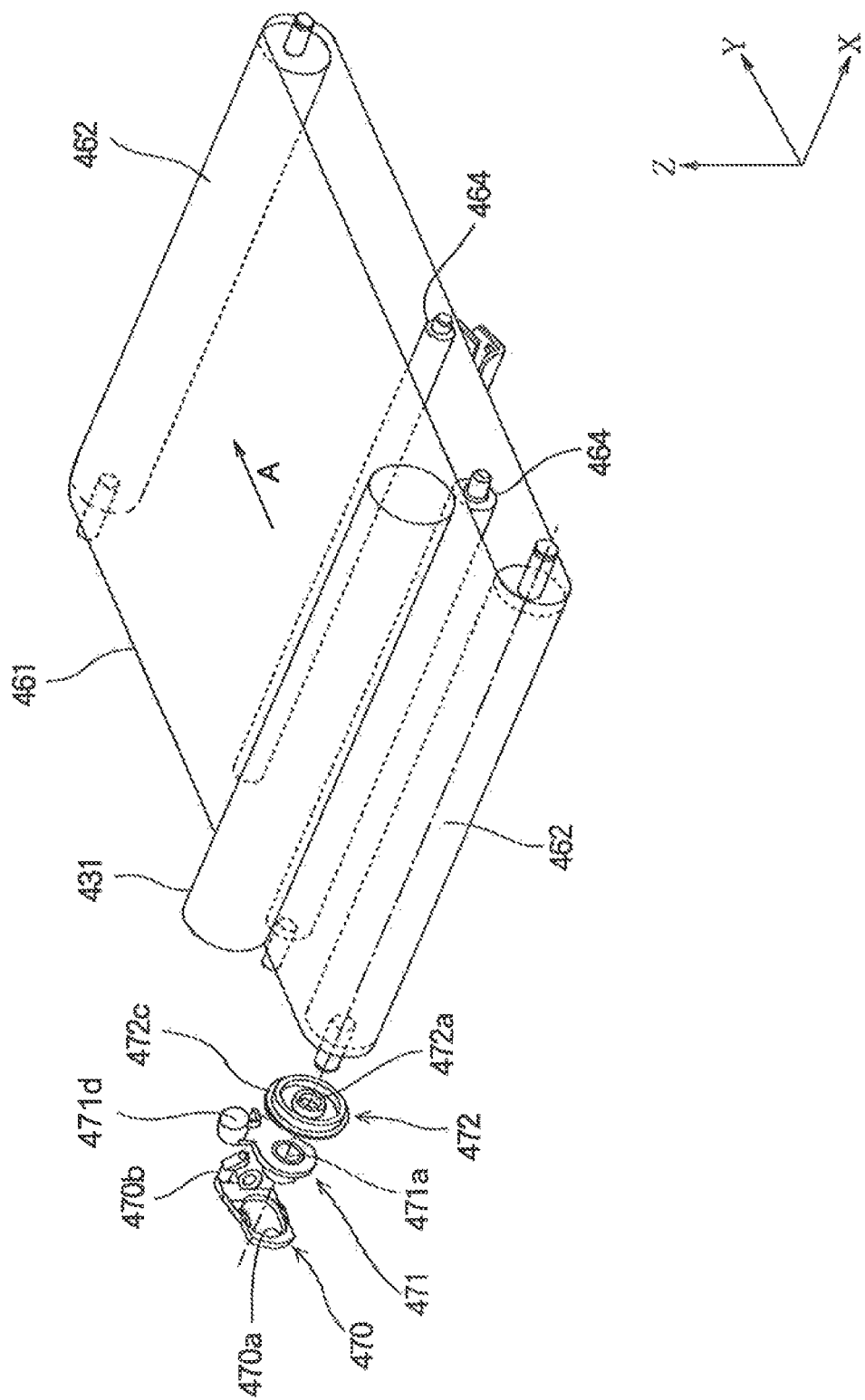

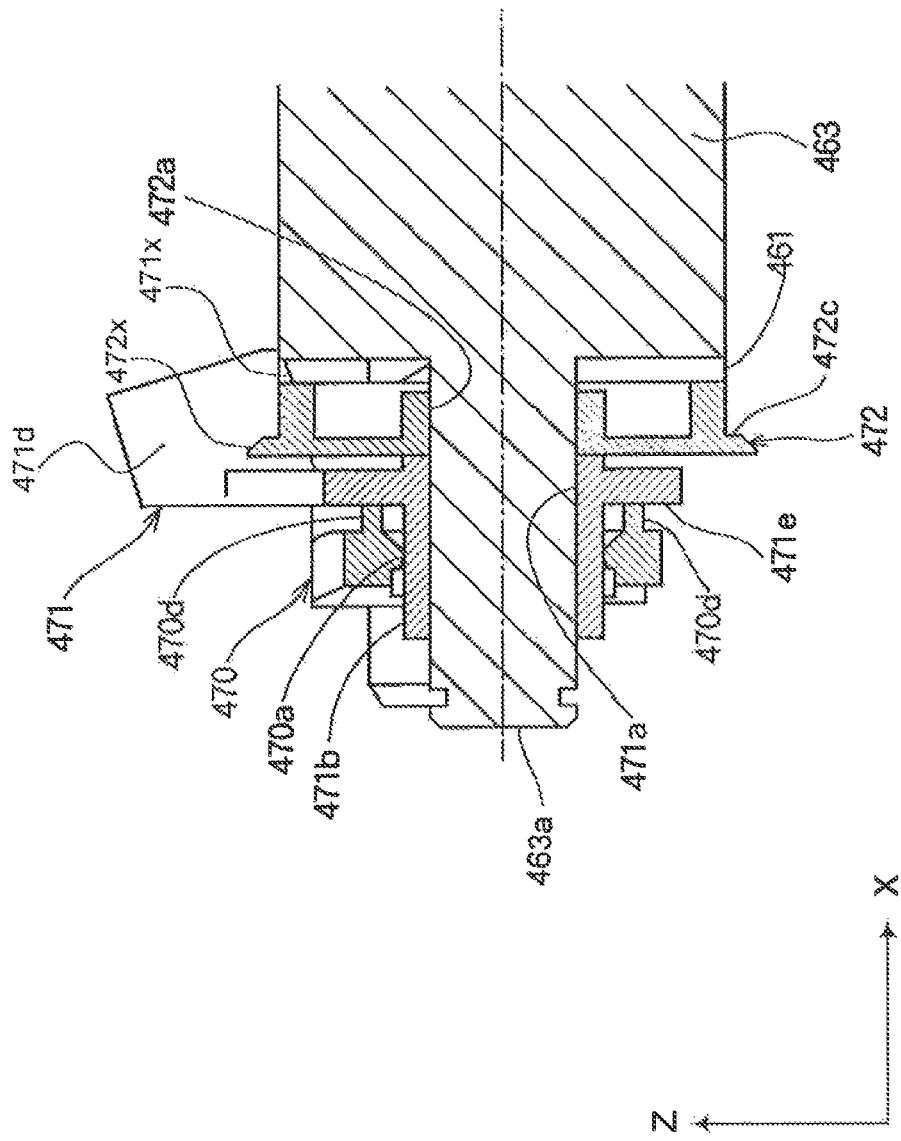

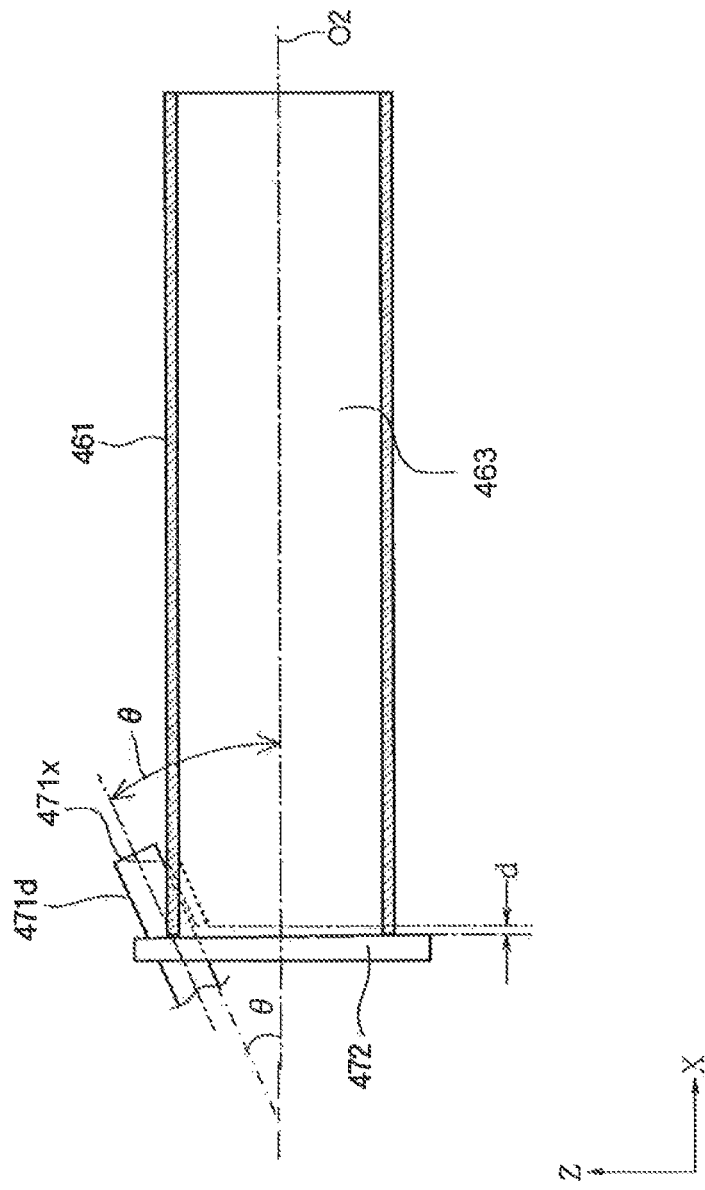

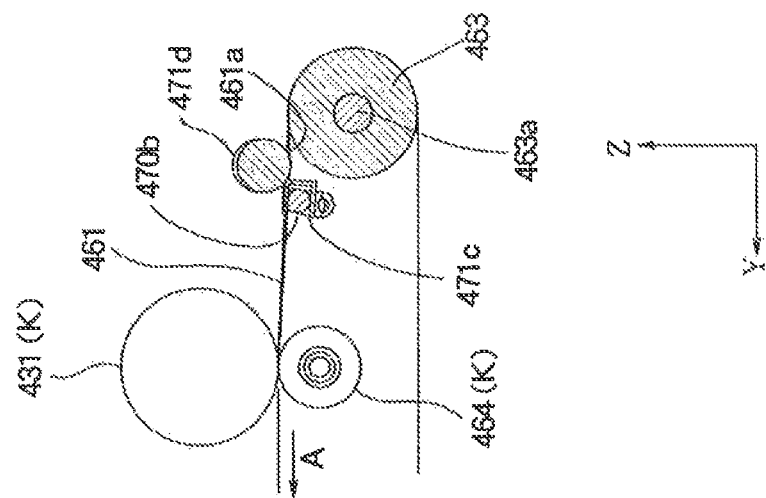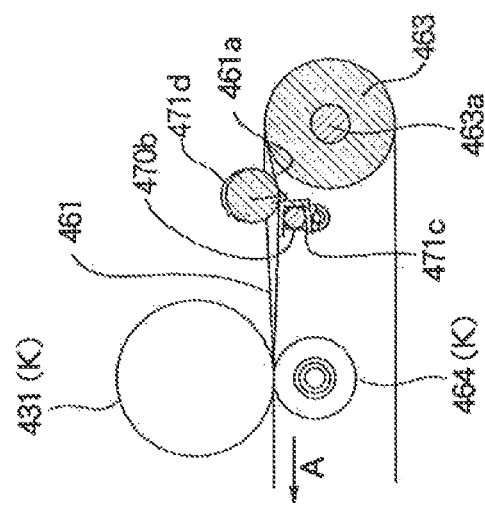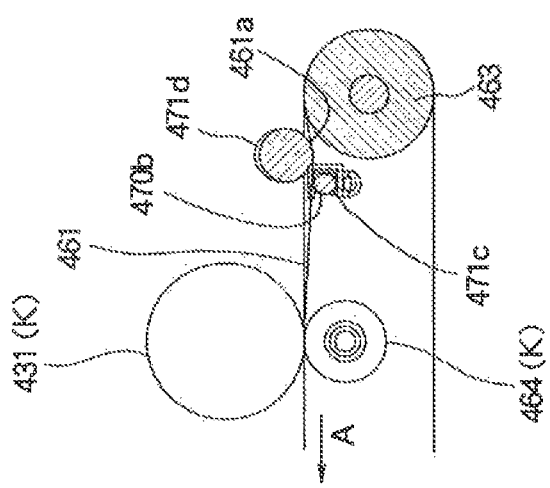

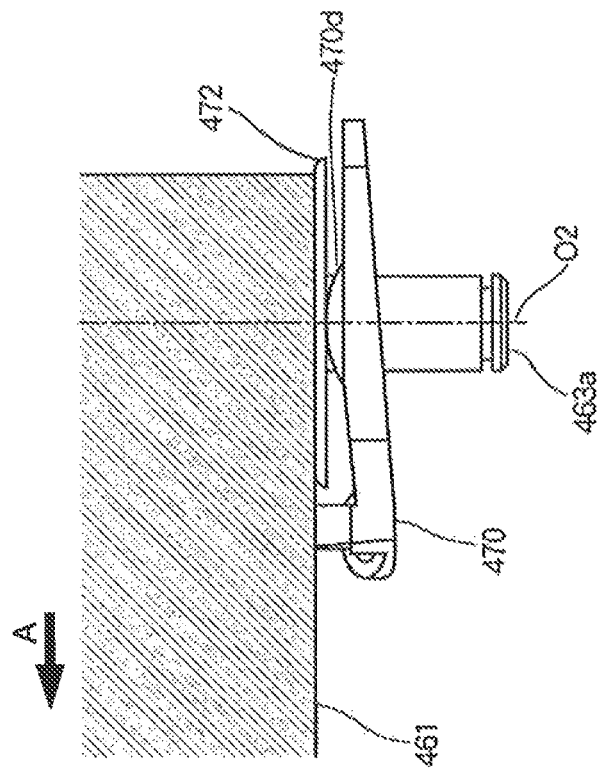

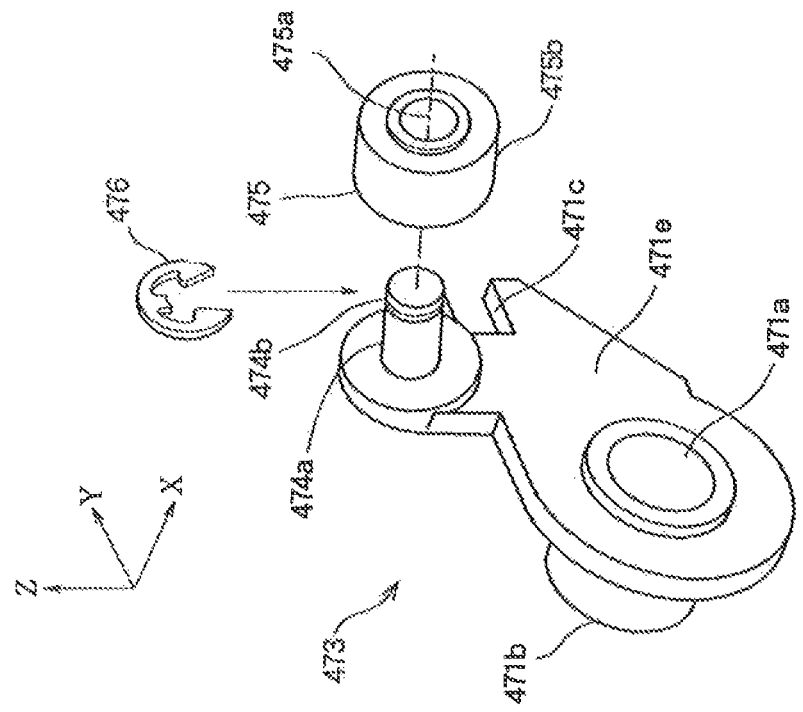
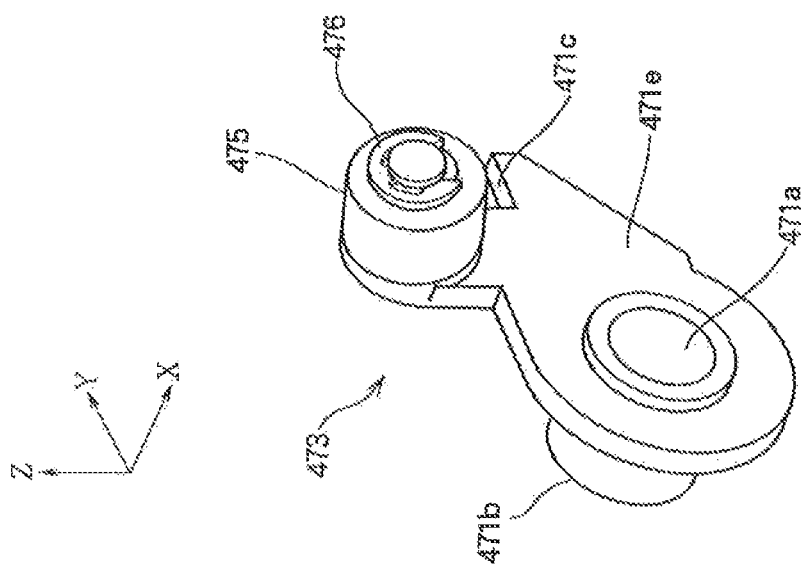

BELT DRIVING DEVICE AND IMAGE FORMING APPARATUS

CROSS REFERENCE TO RELATED APPLICATION

The present application is related to, claims priority from and incorporates by reference Japanese Patent Application No. 2012-016346, filed on Jan. 30, 2012.

TECHNICAL FIELD

The present invention relates to a belt driving device, and an image forming apparatus including the belt driving device.

BACKGROUND

A belt driving device that includes an endless belt is used in an electrographic type image forming apparatus to carry a recording medium.

The belt driving device bridges a belt on a two parallel rollers and drives the belt by rotating one of the rollers. However, while driving, the belt may skew due to the parallelism of the two rollers, uneven tension of the belt, dimensional accuracy of each roller and the like.

Therefore, a belt driving device has been proposed that suppresses the skew of the belt by changing inclination of one of the rollers in response to the skew state of the belt (see Japanese Laid-Open Patent Application No. 2006-162659 (claim 1, paragraphs 0038-0043 and FIGS. 11-13). In this belt driving device, a pulley that guides side edge parts (edge parts in the width direction) of the belt is provided movably in the axial direction of the roller, and a roller shaft displacement member is provided that displaces one end of a roller shaft up and down in response to the movement of the pulley.

However, in the conventional belt driving device, a large load (applied force, frictional force, etc.) is applied to the side edge part of the belt as the side edge part of the skew belt contacts the pulley. Conventionally, life of the belt is determined by assuming that the belt driving device is used under such conditions. However, recently, further extension of the life of the belt is desired.

The present invention considers the above-described problem and has an object to suppress the load to the belt and to extend the life of the belt and the belt driving device.

SUMMARY

One of a belt driving devices disclosed in the application, which drives a belt, includes a plurality of rollers, an endless belt tensioned on the plurality of rollers, a belt guide member that is mounted on at least one end of at least one roller of the plurality of rollers and that guides a side edge part of the belt, and a belt displacement device that is mounted on the same end of the one roller as the belt guide member in order to displace the side edge part of the belt in a direction away from the belt guide member. Wherein a portion of the belt displacement device is located on a downstream side of the belt guide member in a traveling direction of the belt, and the portion continuously contacts the side edge part of the belt.

In another view, an image forming apparatus which includes the above belt driving device and an image forming part that forms an image on either a surface of a recording medium, which is carried by the belt of the belt driving device, or a surface of the belt, is disclosed.

According to the present invention, the load to the belt is suppressed, and the life of the belt and the belt driving device is extended.

BRIEF DESCRIPTION OF THE DRAWINGS

FIG. 2A is a top view of a configuration of a belt unit according to the first embodiment of the present invention.

FIG. 5 is an exploded perspective view of the configuration of the main part of the belt unit according to the first embodiment of the present invention.

FIG. 7 is a cross-sectional view of an enlargement of the part of the belt unit according to the first embodiment of the present invention.

FIG. 10 illustrates a positional relationship between a belt contact part of a subtensioner, the belt and a pulley.

FIGS. 11A-11C are schematic diagrams for explaining actions of the subtensioner according to the first embodiment of the present invention.

FIGS. 12A and 12B are schematic diagrams comparing the action of the subtensioner (FIG. 12A) and the case when the subtensioner is not provided (FIG. 12B).

FIG. 15A is a perspective view of a configuration of the subtensioner according to a second embodiment. FIG. 15B is an exploded perspective view of the configuration of the subtensioner according to the second embodiment.

DETAILED DESCRIPTION OF EMBODIMENTS

Figure 1:
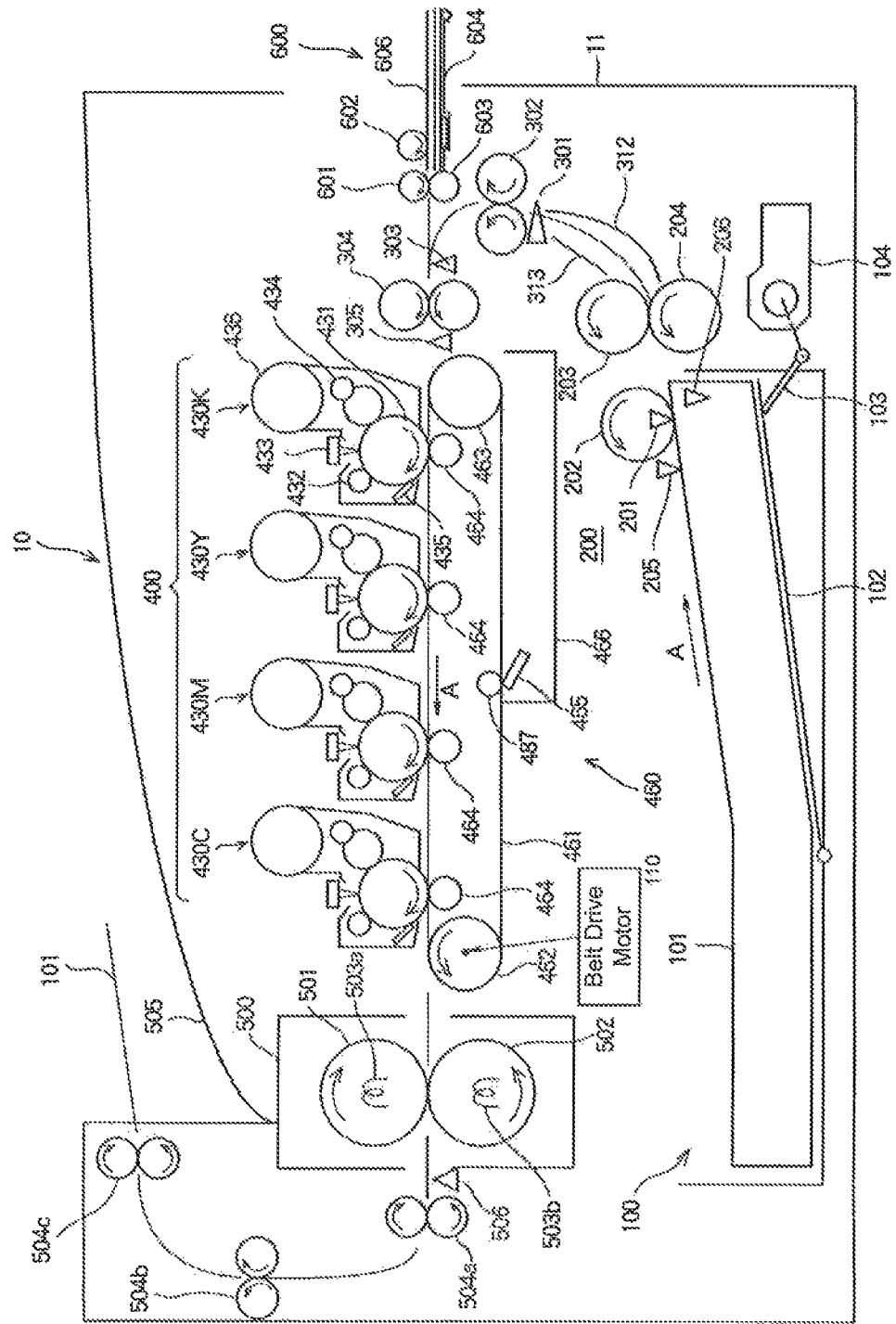
FIG. 1 illustrates a basic configuration of an image forming apparatus according to a first embodiment of the present invention.

FIG. 1 illustrates a basic configuration of an image forming apparatus 10 according to a first embodiment of the present invention. In FIG. 1, the image forming apparatus 10 includes a removable sheet supply tray 100 in which sheets (recording media) 101 are accommodated at a lower part of a main body 11. The sheet supply tray 100 includes a stacking plate 102 that stacks the sheets 101, a lift-up lever 103 that lifts up the stacking plate 102, and a pickup roller 202 that feeds the sheets 101 on the stacking plate 102.

The stacking plate 102 is configured swingably about a shaft in the sheet supply tray 100. The lift-up lever 103 is positioned on the feeding side (right side in FIG. 1) of the sheet supply tray 100 and is driven by a lift-up motor 104 to rotate. The lift-up lever 103 and the lift-up motor 104 are configured to connect or release transmission of drive force. In addition, on the sheet supply tray 100, a rise detection sensor 201 that detects that the sheets on the stacking plate 102 has reached a height to contact a pickup roller 202, a sheet presence detection sensor 205 that detects presence of the sheets 101 on the stacking plate 102, and a sheet remaining amount sensor 206 that detects a remaining amount of the sheets 101 are provided.

On the feeding side (right side in the figure) of a pickup roller 202, a feed roller 203 and a retard roller 204 are positioned to contact each other. A medium feeding part 200 is configured from the pickup roller 202, the feed roller 203 and the retard roller 204. The pickup roller 202 and the feed roller 203 are respectively driven to rotate in an arrow direction by a sheet supply motor (not shown). Each of the pickup roller 202 and the feed roller 203 has a built-in one-way clutch mechanism and is configured to feely rotate in the arrow direction even if the rotation of the sheet supply motor stops.

The pickup roller 202 feeds the sheets 101 by contacting and rotating on the sheets 101 stacked on the image forming apparatus 102. The retard roller 204 generates a torque in the arrow direction by a torque generation device (not shown). Therefore, each sheet 101 is feed by the feed roller 203 and the retard roller 204 even when the pickup roller 202 pulls multiple sheets 101 at the same time.

In a carrying direction of the sheet 101, guide members 312 and 313 that guide the sheet 101, a carrying roller pair 302 that restricts skew of the sheet 101, and a carrying roller pair 304 that carries the sheet to an image forming part 400 (discussed later) are positioned on a downstream side of the medium feeding part 200. A medium carrying part 300 is configured from the carrying roller pair 302, the guide members 312 and 313, and the carrying roller pair 304.

In addition, a sheet sensor 301 that detects passage of the sheet 101 is positioned adjacent to the carrying roller pair 302 on an upstream side thereof in the carrying direction of the sheet 101. Moreover, a sheet sensor 303 that determines timing for driving the carrying roller pair 304, and a write sensor 305 that determines timing for starting writing (exposure) by the image forming part 400 are positioned on the upstream side and the downstream side of the carrying roller pair 304, respectively.

Each of the carrying roller pair 302 and the carrying roller pair 304 is driven to rotate by the drive force transmitted from a carrying motor (not shown) though a gear array and the like. The rotation is controlled by a sheet carriage controller (not shown).

A multi-paper tray (MPT) 600 is provided on one side surface (right side surface in FIG. 1) of the image forming apparatus 10 as a medium supply device. The MPT 600 includes a stacking plate 604 that stacks sheets (recording media) 606, a pickup roller 602 that feeds each of the sheets 606 staked on the stacking plate 604, a sheet supply roller (feed roller) 601 that feeds the fed sheet 606 inside the main body 11 of the image forming apparatus 10, and a retard roller 603 that is positioned to contact a sheet supply roller 601 for separating each sheet 606.

The image forming part 400 of the image forming apparatus 10 includes four process units 430K, 430Y, 430M and 430C that form toner images in respective colors using toner in black, yellow, magenta and cyan. The process units 430K, 430Y, 430M and 430C are arranged in order from the upstream side (right side of FIG. 1) along the carrying path of the sheet 101 and removably installed in the main body 11 of the image forming apparatus 10. The process units 430K, 430Y, 430M and 430C include common internal configurations. Therefore, the process units 430K, 430Y, 430M and 430C are collectively referred to as a "process unit 430." The internal configuration is explained below.

The process unit 430 includes a photosensitive body (e.g., photosensitive drum 431) as an electrostatic latent image carrier. The photosensitive drum 431 is rotatably supported and is rotated in the arrow direction (clockwise direction in the figure) by a motor (not shown). Around the photosensitive drum 431, a charge roller charge roller 432 as a charge member that uniformly charges a surface of the photosensitive drum 431, an exposure device 433, such as a light emitting diode (LED) head and the like, that selectively exposes the surface of the uniformly charged photosensitive drum 431 to form an electrostatic latent image thereon, a development device 434 that develops the electrostatic latent image on the surface of the photosensitive drum 431 with toner, and a cleaning blade 435 as a cleaning member that removes remaining toner, are arranged in order from the upstream side along the rotational direction of the photosensitive drum 431.

A toner cartridge 436 is mounted above the development device 434 as a developer container that contains the toner to be supplied to the development device 434. Each of the rollers and the photosensitive drum 431 is driven by a drive force transmitted from the motor (not shown) through gear arrays.

A belt unit (belt drive device) 460 is positioned below the process units 430K, 430Y, 430M and 430C in the figure. The belt unit 460 includes an endless belt (also called transfer belt) 461 that sucks the sheet 101 by electrostatic force and carries the sheet 101, and a drive roller 462 and a 463 that tension the belt 461. The drive roller 462 is driven to rotate by a drive force transmitted from the main body 110 through gear arrays and the like, and is controlled by a belt drive controller. By the rotation of the drive roller 462, the belt 461 travels (or circles) in a direction indicated by arrow A.

In addition, below the belt 461, a cleaning blade 465 as a cleaning member that scrapes off the toner attached to the belt 461, a roller 467 positioned to face the cleaning blade 465 across the belt 461, and a toner box 466 as a waste developer container that contains the toner scraped off by the cleaning blade 465 are positioned.

Against each photosensitive drum 431 in the process units 430K, 430Y, 430M and 430C, a transfer roller 464 that includes an elastic layer formed from conductive rubber on a surface thereof is pressed via the belt 461. To each transfer roller 464, electric potential is applied for generating a potential difference from a surface potential of the photosensitive drum 431 at the time of transferring a toner image on the photosensitive drum 431 onto the sheet 101. A detailed configuration of the belt unit 460 is discussed later.

In the carrying direction of the sheet 101, a fuser 500 is positioned on the further downstream side (left side in the figure) than the image forming part 400 (process units 430K, 430Y, 430M, 430C). The fuser 500 includes an upper roller 501 and a lower roller 502, which are a pair of rollers which surfaces are formed with elastic bodies. The upper roller 501 and the lower roller 502 respectively include halogen lamps 503a and 503b as heat sources. The fuser 500 melts the toner image on the sheet 101 fed from the image forming part 400 by applying heat and pressure to the toner image and fuses the toner image onto the sheet 101. Operation of the fuser 500 is controlled by a fusion controller.

In the carrying direction of the sheet 101, ejection roller pairs 504a, 504b and 504c that eject the sheet 101 to a stacker part 505 provided on an upper cover of the image forming apparatus 10, are positioned on the downstream side (left side in the figure) of the fuser 500. These ejection roller pairs 504a, 504b and 504c are driven to rotate by the drive force transmitted from a carrying motor through gear arrays and the like, and the rotation is controlled by a sheet carrying controller. Moreover, a sheet sensor 506 is positioned on the downstream side of the fuser 500 for detecting rotation timing for the ejection roller pairs 504a, 504b and 504c.

Next, basis operation of the image forming apparatus 10 is explained. When the image forming apparatus 100 is installed to the main body 11 of the image forming apparatus 10, the image forming apparatus 103 and the image forming apparatus 104 are linked. As the image forming apparatus 104 rotates, the image forming apparatus 103 turns to lift the image forming apparatus 102, and thereby, the sheet 101 stacked on the image forming apparatus 102 is raised. When the sheet 101 rises to the height to contact the pickup roller 202 and is detected by the rise detection sensor 201, the rotation of the image forming apparatus 104 is stopped. As the pickup roller 202 rotates in this state, each sheet 101 stacked on the image forming apparatus 102 is fed out and is carried to the medium carrying part 300 by the feed roller 203 and the retard roller 204.

At the medium carrying part 300, the sheet 101 is carried along the guide members 312 and 313 and reaches the carrying roller pair 302 after passing the sheet sensor 301. The carrying roller pair 302 starts rotating at predetermined timing after the sheet 101 passes the sheet sensor 301 to carry the sheet 101. By delaying the timing to start the rotation of the carrying roller pair 302, the sheet 101 is crammed into a pressed part of the carrying roller pair 302, and thereby, the skew of the sheet 101 is corrected.

The sheet 101 fed out from the carrying roller pair 302 passes the sheet sensor 303 and reaches the carrying roller pair 304. The carrying roller pair 304 starts rotating at the time when the sheet 101 passes the sheet sensor 303 and carries the sheet 101 to the image forming part 400 without stopping.

At the image forming part 400, the drive roller 462 of the belt unit 460 rotates, and the belt 461 travels in the direction indicated by arrow A in FIG. 1. The belt 461 sucks and holds the sheet 101 by electrostatic force and carries the sheet 101 along the process units 430K, 430Y, 430M and 430C.

At the process unit process unit 430K, the exposure device 433 forms an electrostatic latent image by exposing the surface of the photosensitive drum 431 based on image information after the charge roller 432 uniformly charges the surface of the photosensitive drum 431. Furthermore, the development device 404 develops the electrostatic latent image on the surface of the photosensitive drum 431 using the toner (developer) to form a toner image (developer image).

The toner image formed on the surface of the photosensitive drum 431 is transferred onto the sheet 101 on the belt 461 by the transfer roller 464. The toner remaining on the surface of the photosensitive drum 431 after the transfer of the toner image is removed by the cleaning blade 435. As a result, a black toner image is transferred onto the surface of the sheet 101.

Similarly, at the process units 430Y, 430M and 430C, yellow, magenta and cyan toner images are sequentially transferred on to the sheet 101. The belt unit 460 carries the sheet 101, on which the toner images in various colors have been transferred, to the fuser 500. In addition, the toner attached to the belt 461 is scraped off by the cleaning blade 465 and collected in the toner box 466.

At the fuser 500, the toner images are heated and pressed by the upper roller 501 and the lower roller 502 and fixed to the sheet 101.

The sheet 101, on which the toner images have been fixed, is ejected from the main body 11 of the image forming apparatus 10 by the ejection roller pairs 504a, 504b and 504c and is stacked on the stacker part 505. This completes the image forming process for the sheet 101. The image formation is similarly achieved to the sheet 606 supplied from the MPT 600.

Figure 2B:
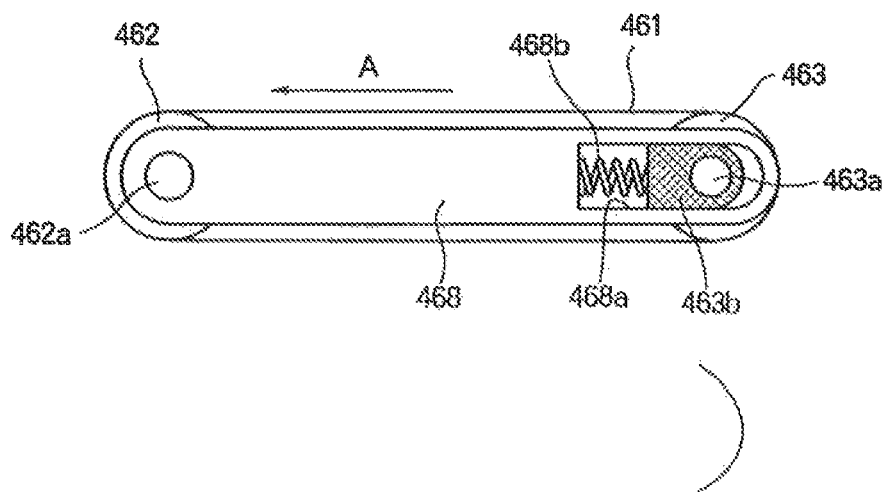
FIGS. 2B and 2C are side views of the configuration of the belt unit according to the first embodiment of the present invention.
Figure 2C:
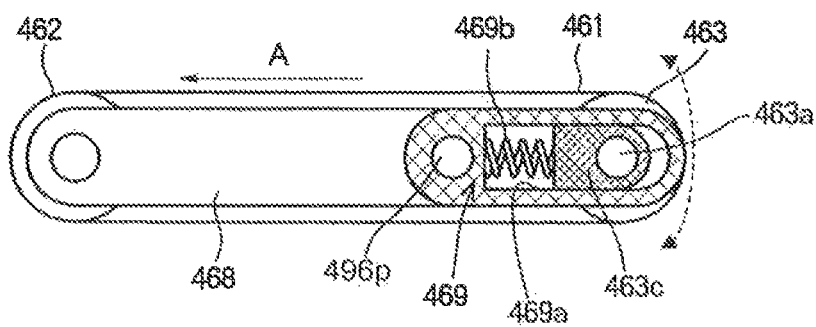
Figure 3:
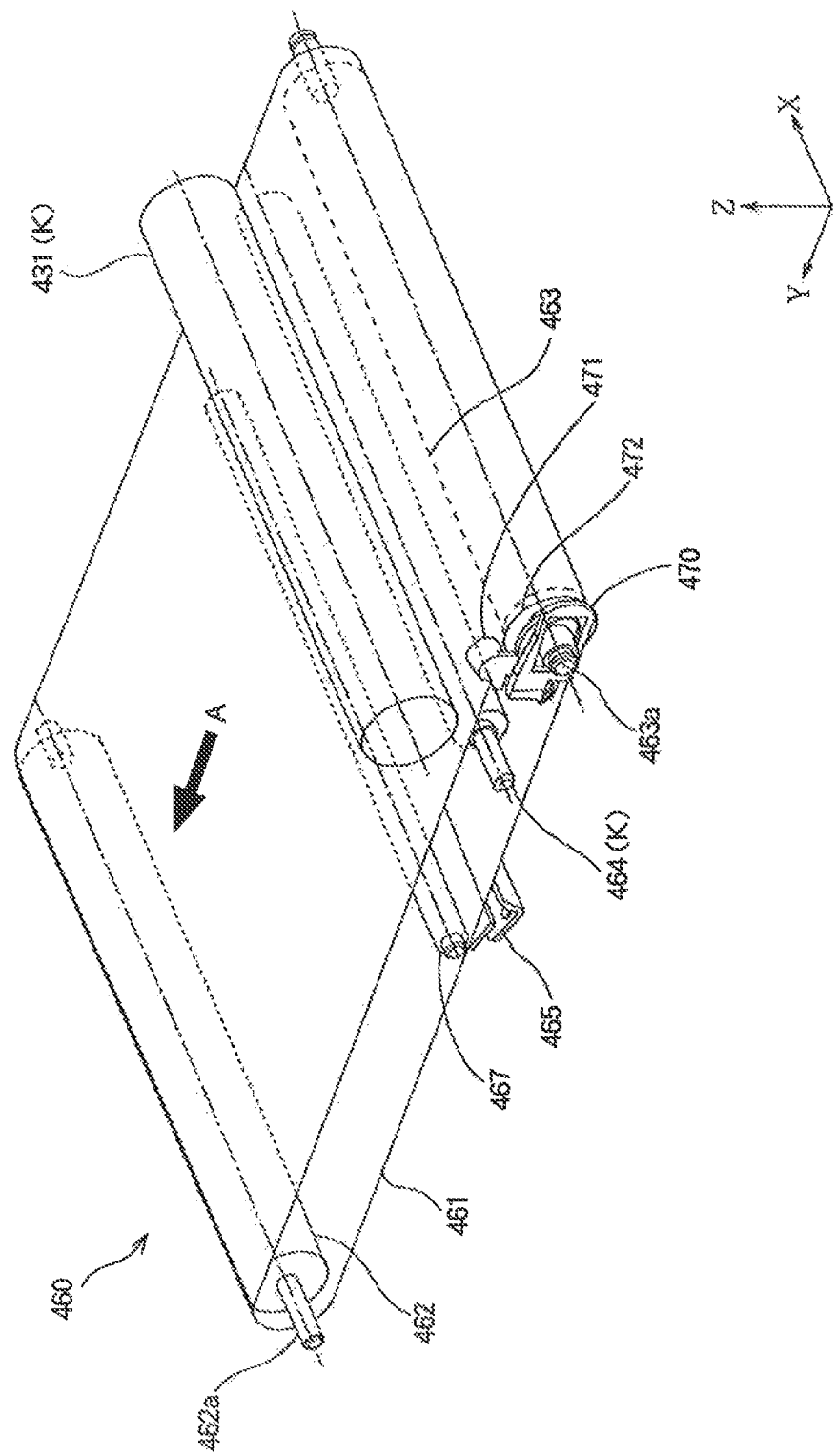
FIG. 3 is a perspective view of a configuration of a main part of the belt unit according to the first embodiment of the present invention.
Figure 4:
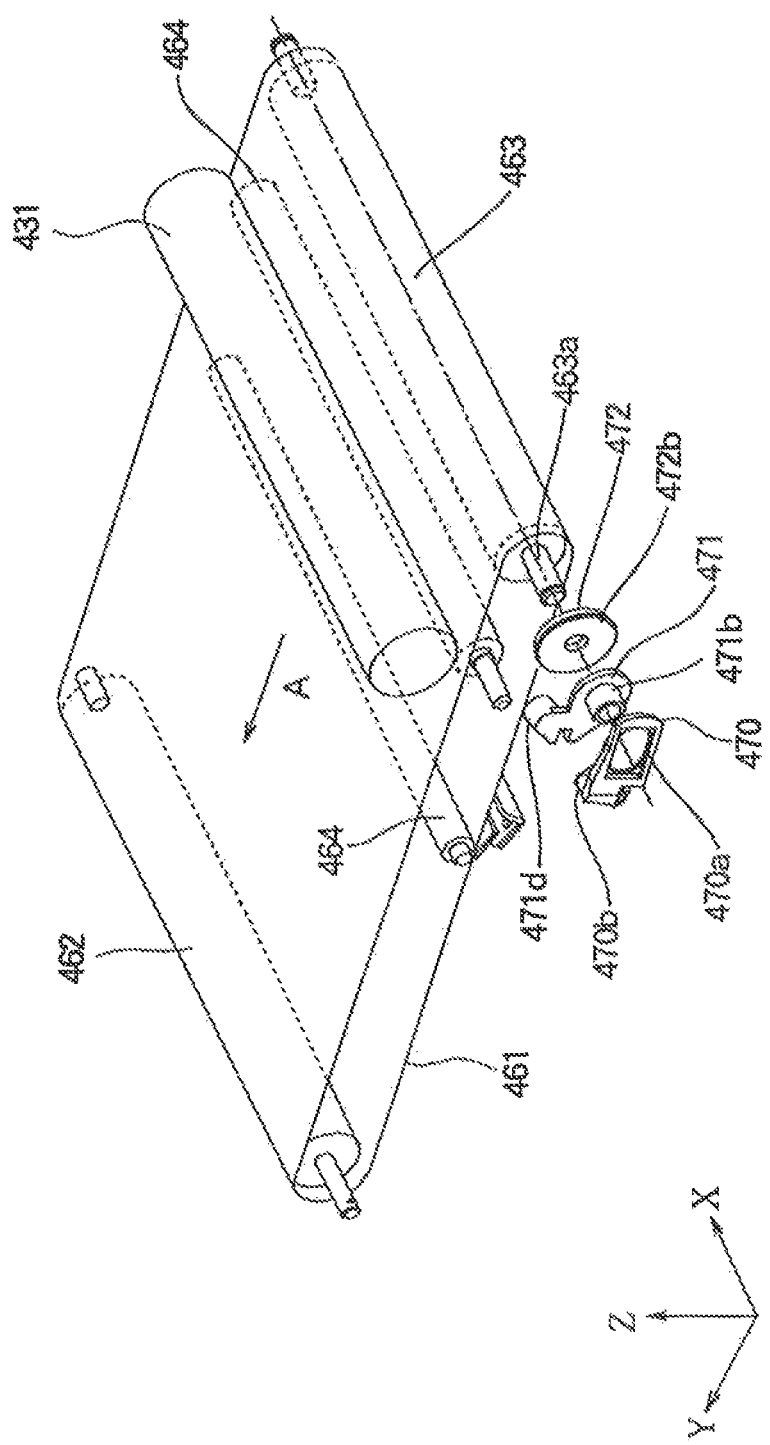
FIG. 4 is an exploded perspective view of the configuration of the main part of the belt unit according to the first embodiment of the present invention.
Figure 6A:
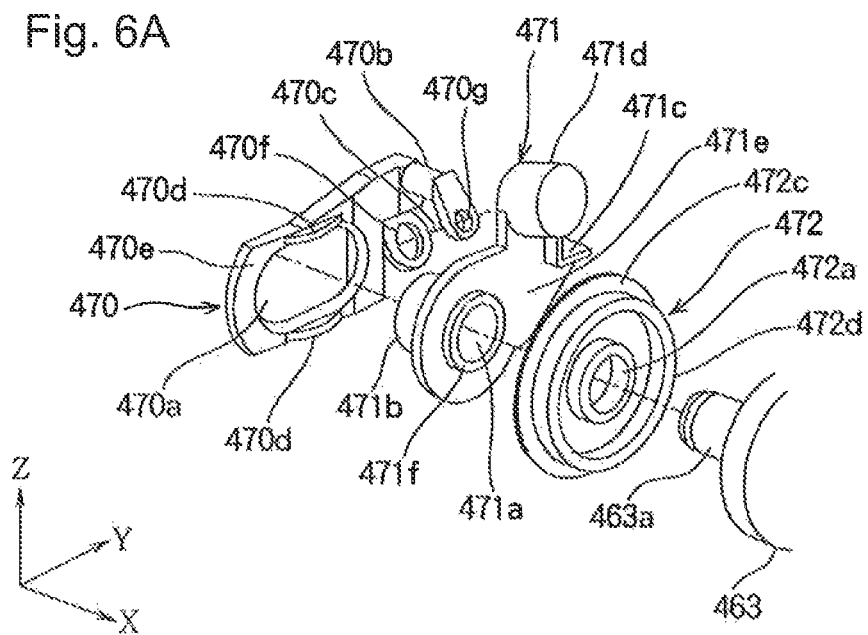
FIGS. 6A and 6B are exploded perspective views of an enlargement of a part of the belt unit according to the first embodiment of the present invention.
Figure 6B:
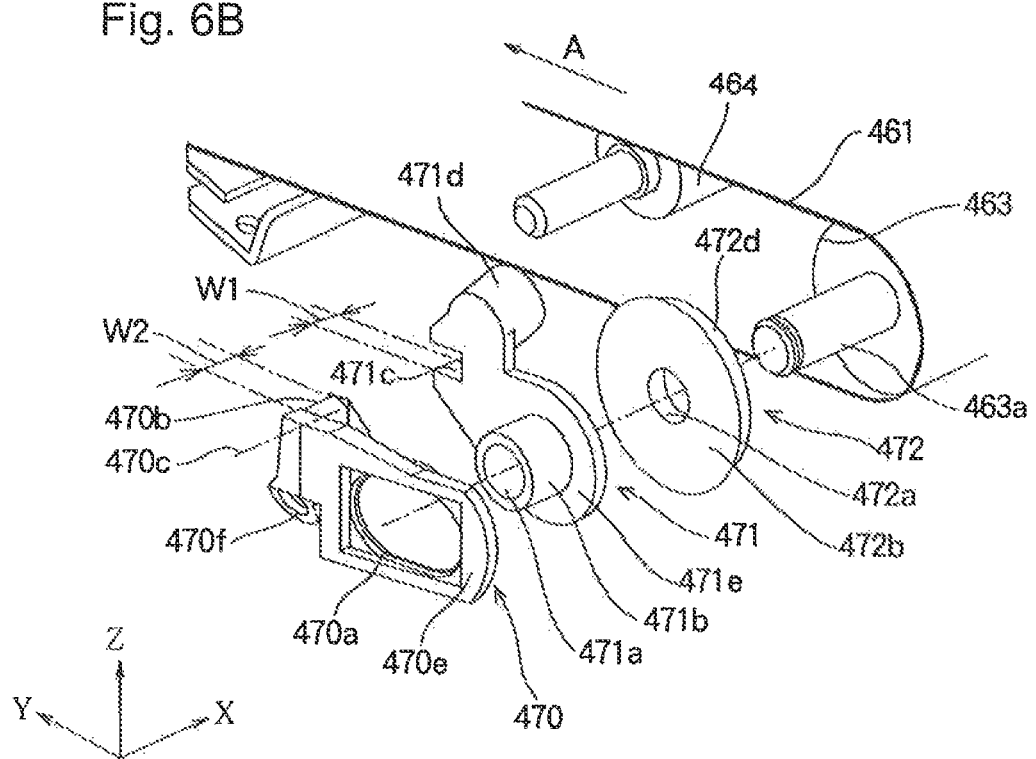

Next, details of the belt unit 460 are explained. FIG. 2A is a top view of a configuration of the belt unit 460 according to the present embodiment. FIGS. 2B and 2C are side views of the configuration of the belt unit 460 viewed from directions of arrows B and C in FIG. 2A, respectively. FIG. 3 is a perspective view of a configuration of a main part of the belt unit 460. FIGS. 4 and 5 are an exploded perspective views of the configuration of the main part of the belt unit 460. FIGS. 6A and 6B are exploded perspective views of an enlargement of a part of the belt unit 460. FIGS. 3 to 5 also illustrate the photosensitive drum 431 of the process unit 430K.

As shown in FIG. 2A, the belt unit 460 includes unit frames 468 positioned on both sides of the belt 461 in the width direction. The drive roller 462 is a roller including a surface layer made of rubber, for example, having a high frictional coefficient. Both ends of a shaft 462a of the drive roller 462 are mounted on the unit frames 468 via bearings (not shown). Moreover, a gear 462b, to which a motive power of the main body 110 (FIG. 1) is transmitted, is mounted on an end of the shaft 462a.

The tension roller 463 is a driven roller that is positioned approximately in parallel with the drive roller 462 and that rotates in accordance with the drive roller 462. The tension roller 463 is biased in the direction away from the drive roller 462 and applies a tension to the belt 461.

Below, a perpendicular direction is referred to as a Z direction, and an axial direction of the drive roller 462 (assuming that the drive roller 462 is placed horizontally) is referred to as an X direction. A direction orthogonal to the X and Z directions is referred to as a Y direction. The Y direction is approximately in parallel with the traveling direction of the belt 461.

As shown in FIG. 2B, a bearing part 463b is mounted to an end of the shaft 463a of the tension roller 463. The bearing part 463b is slidably mounted to an inside of an elongate hole opening part 468a formed in the unit frames 468. In addition, using a bearing that rotatably supports the shaft 463a, the shaft 463a may be positioned in the bearing part 463b.

On the other hand, as shown in FIG. 2C, a bearing part 463c is mounted to the other end of the shaft 463a of the tension roller 463. The bearing part 463c is supported to an arm 469 that is swingabable around a shaft 469p and mounted on the unit frames 468. The swing movements of the arm 469 is shown with a dotted arrow. The arm 469 is swingable but the swingable range is limited in a predetermined range. An elongate hole opening part 469a is formed in the arm 469. The bearing part 463c is slidably mounted inside the opening part 469. In addition, using a bearing that rotatably supports the shaft 463a, the shaft 463a may be positioned in the bearing part 463c.

The bearing parts 463b and 463c at the both ends of the shaft 463a of the tension roller 463 are biased in a direction away from the drive roller 462 by springs 468b and 469b provided inside the opening parts 468a and 469a, respectively. As a result, the tension roller 463 is biased in the direction away from the drive roller 462, and a tension is applied to the belt 461.

As shown in FIGS. 4 and 5, a pulley 472 (belt guide member), a subtensioner 471 (belt displacement device) and an adjustment lever 470 (roller shaft displacement device) are coaxially positioned, in the order from the inner side in the width direction of the belt 461, on one end (end on the arm 469 side shown in FIG. 2C) of the shaft 463a of the tension roller 463. The arm 469 shown in FIG. 2C is provided further outside of the adjustment lever 470 and is omitted in FIG. 4 and the like.

As shown in FIGS. 6A and 6B, the pulley 472 is an approximately disk shape member and includes a shaft hole part 472a in the center thereof that engages with the shaft 463a of the tension roller 463. By the engagement of the shaft hole part 472a and the shaft 463a, the pulley 472 is mounted rotatably about the shaft 463a of the tension roller 463 and movably along the tension roller 463.

In addition, as shown in FIG. 6A, a flange part (contact part) 472c that contacts the side edge part (width direction edge part) of the belt 461 is formed on the outer circumference of the pulley 472. A ring part 472d that contacts an inner circumference surface of the belt 461 is formed further inside of the pulley 472 than the flange part 472c. A contact surface 472b that contacts the subtensioner 471 is formed on the subtensioner 471 side of the pulley 472.

On the outer circumference of the flange part 472c, an inclination surface is formed. See 472x in FIG. 7. The surface 472x functions as a guide when the belt travels and enters the roller which is on the downstream side. When the belt enters the roller, the surface 472x guides the direction of the belt inwardly with respect to the belt guide member. Thereby, it is not necessary to dispose a belt displacement device in the upstream side.

The subtensioner 471 includes a plate shape base part 471e and a shaft hole part 471a. The shaft hole part 471a engages with the shaft 463a of the tension roller 463. By the engagement of the shaft hole part 471a and the shaft 463a, the subtensioner 471 is mounted rotatably about the shaft 463a of the tension roller 463 and movably along the shaft 463a. In other words, the subtensioner 471 can slide along the shaft 463a in X direction of FIG. 6B.

A ring contact surface 471f (FIG. 6A) that contacts the above-discussed contact surface 472b of the pulley 472 is formed on the pulley 472 side of a base part 471e of the subtensioner 471. In addition, a cylindrical sleeve 471b is formed to protrude on the adjustment lever 470 side of the base part 471e. The above-discussed shaft hole part 471a is formed inside the sleeve 471b.

The base part 471e of the subtensioner 471 includes a shape that extends to the drive roller 462 side and upwardly. On the upper end part of the base part 471e, a cylindrical belt contact part 471d that inclines towards the surface of the belt 461 (more specifically, inclined with respect to the axial direction of the tension roller 463) is provided. The belt contact part 471d protrudes towards the inside of the width direction of the belt 461 from the side edge part (edge part in the width direction) of the belt 461 and includes an inclination surface 471x of which the height (position in the Z direction) increases toward the inside of the width direction of the belt 461 (i.e., the inclination surface 471x of a distance between the belt contact part 471d and the shaft 463a increases as separated away from the side edge part of the belt 461).

As shown in FIG. 6B, a guide groove 471c that opens to the drive roller 462 side is formed below the belt contact part 471d of the base part 471e. The guide groove 471c has a predetermined length in a direction toward the drive roller 462 (approximate Y direction) and a predetermined width W1 in the axial direction of the tension roller 463.

The adjustment lever 470 includes a frame shape base part 470e and an elongate hole 470a formed on the base part 470e, for example. The sleeve 471b of the subtensioner 471 passes through and freely fit the elongate hole 470a. The elongate hole 470a is longer in the approximate Y direction. The sleeve 471b is supported movably in the longitudinal direction of the elongate hole 470a. On the base part 470e, projection parts 470d (FIG. 6A) that project to the subtensioner 471 side are formed at upper and lower positions of the elongate hole 470a.

As shown in FIG. 6A, the adjustment lever 470 includes shaft hole parts 470f and 470g (the shaft hole part 470g is shown in FIG. 6B). By engaging the shaft hole parts 470f and 470g with a shaft part (not shown) that is formed on the unit frames 468, the adjustment lever 470 becomes freely rotatable around the shaft part. The center axis of the shaft part is a rotational axis 470c (dashed-dotted line). A direction of the rotational axis 470c inclines with respect to the axial direction of the tension roller 463. That is, the adjustment lever 470 is rotatable about the rotational axis 470c that inclines with respect to the axial direction of the tension roller 463. Above the shaft hole part of the base part 470e, a cylindrical guide shaft 470b that protrudes to the subtensioner 471 side is formed. The shaft hole part 470g is formed at the front end of the guide shaft 470b.

The guide shaft 470b of the adjustment lever 470 protrudes in the axial direction of the tension roller 463. A size W2 (FIG. 6B) in the protrusion direction is greater than a width W1 (width in the axial direction of the tension roller 463) of the guide groove 471c of the subtensioner 471. The guide shaft 470b of the adjustment lever 470 engage with the above-discussed guide groove 471c of the subtensioner 471. With the engagement, the adjustment lever 470 rotates in response to the subtensioner 471.

FIG. 7 illustrates a state where the pulley 472, the subtensioner 471 and the adjustment lever 470 are mounted on the bearing part 463c of the toner cartridge 436. As discussed above, the shaft 463a of the tension roller 463 is inserted through the shaft hole parts 472a and 471a of the pulley 472 and the subtensioner 471. In addition, the sleeve 471b of the subtensioner 471 is inserted through the elongate hole 470a of the adjustment lever 470.

There is a minimum clearance formed between the shaft hole part 471a of the subtensioner 471 and the elongate hole 470a of the adjustment lever 470 so that the shaft hole part 471a and the elongate hole 470a do not interfere with each other. In addition, the two projection parts 470d of the adjustment lever 470 contact the base part 471e of the subtensioner 471.

The subtensioner 471 and the pulley 472 are movable along the shaft 463a of the tension roller 463.

In addition, the size W2 (FIG. 6B) of the guide shaft 470b of the adjustment lever 470 is greater than the size W1 of the guide groove 471c of the subtensioner 471. Therefore, the guide shaft 470b and the guide groove 471c engage with each other so that the guide shaft 470b and the guide groove 471c are mutually movable (slidable) in the axial direction of the tension roller 463. With the above structure, the adjustment lever 470 follows the movement of the subtensioner 471 as the adjustment lever 470 rotates about the above-discussed rotational axis 470c (FIG. 6B). During the rotation, the sleeve 471b of the subtensioner 471 move in the longitudinal direction of the elongate hole 470a of the adjustment lever 470 (FIG. 6B).

Next, a configuration of the belt unit 460 for preventing the belt 461 from skewing is explained.

Figure 8A:
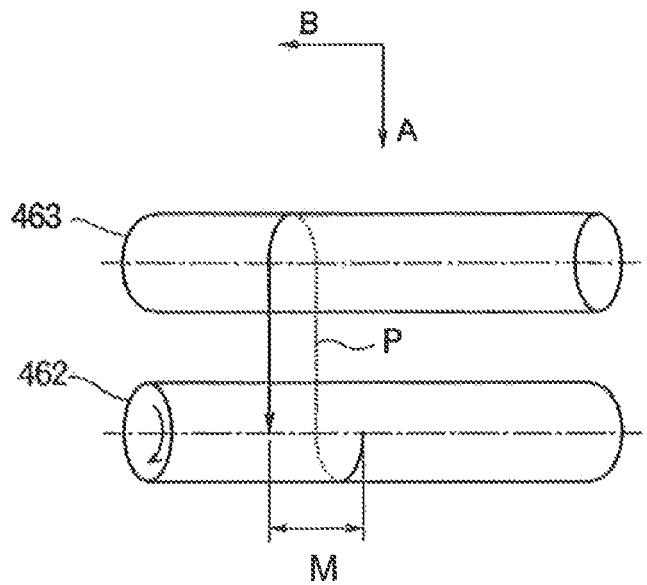
FIGS. 8A to 8D are schematic diagrams for explaining skew states of a belt and swist state of rollers.
Figure 8B:
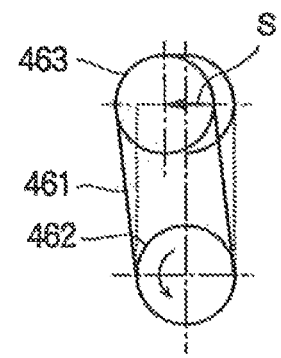
Figure 8C:
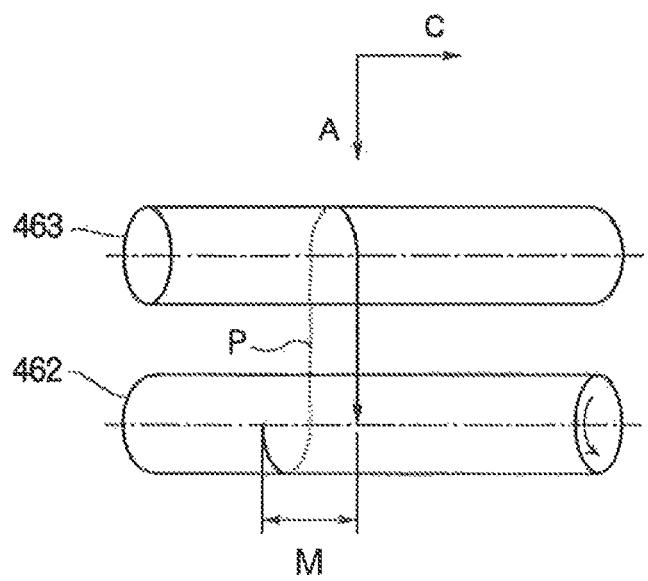
Figure 8D:
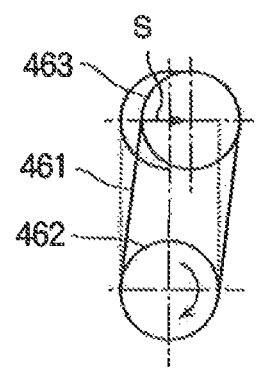

FIGS. 8A to 8D are schematic diagrams for explaining skew state of the belt 461. Specifically, FIGS. 8A and 8C are top views. FIGS. 8C and 8D are respectively side views of FIGS. 8A and 8C.

While the belt 461 travels in a normal status of the rolloers 462 and 463, the surface of the belt 461 travels on a straight path from the top view (or FIGS. 8A and 8C). However, in a swist status where an end (right end in FIG. 8A) of the roller 463 is displaced (or swisted), for example, to the left (see allow S) as shown in FIG. 8A. The belt 461 travels slitly moving to the left, resulting in the bolt 461 skewing in arrow B direction which is perpendicular to the traveling direction (arrow A). On the other hand, the belt 461 skews in the C direction opposite from the arrow B direction when an end of the tension roller 463 is displaced to the right (see symbol S) as shown in FIG. 8D. A skew amount M of the belt 461 is proportional to an amount of twist between the pair of the rollers (drive roller 462 and tension roller 463).

Figure 9A:
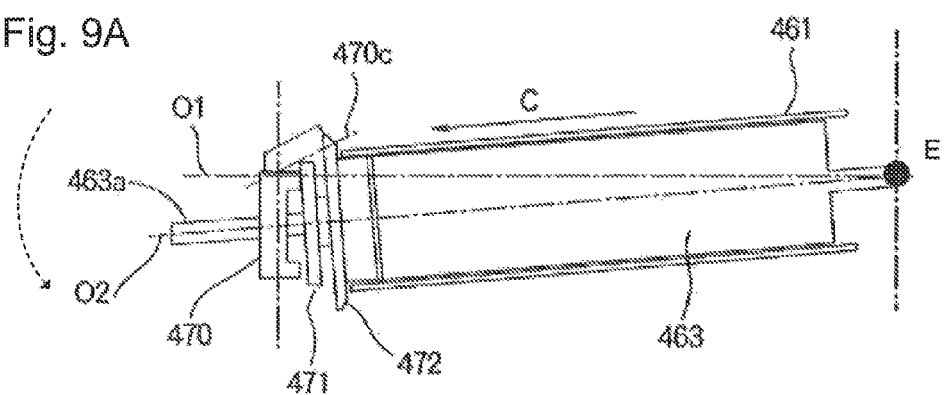
FIGS. 9A to 9C are schematic diagrams for explaining operations to prevent the belt from skewing according to the first embodiment of the present invention.
Figure 9B:
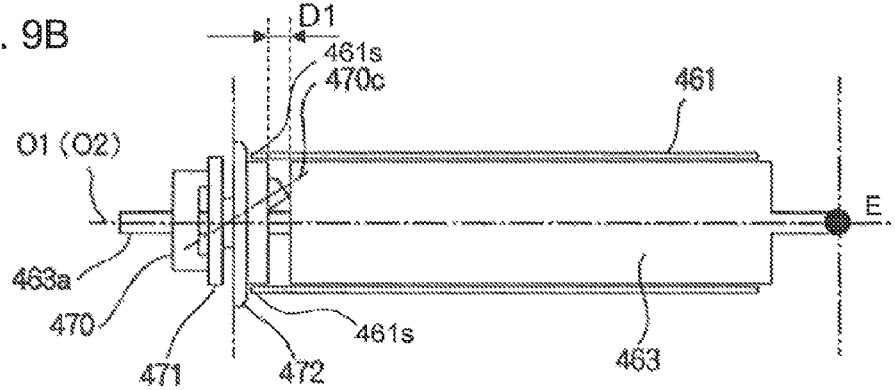
Figure 9C:
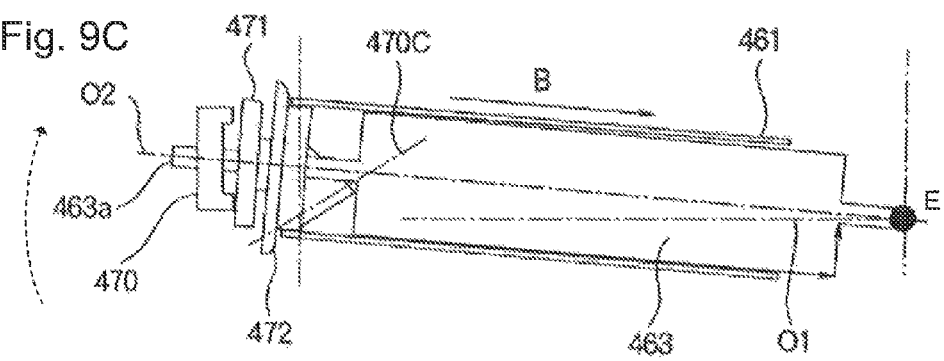

FIGS. 9A to 9C illustrate operations of the belt unit 460 for preventing the belt 461 from skewing.

First, FIG. 9A illustrates a state where the drive roller 462 does not rotate (or the belt 461 rests). In the state, due to its weight the base part 470e swungs around the rotation shaft 470c so that the elongate hole 470a and the sleeve 471b, which is inserted therein, are positioned lower. See FIG. 6B. The swingable range of the adjustment lever 470 is restricted in the same way as the arm 469 (see FIG. 2C). The arm 469 is configured to be swingable only in a predetermined range. The lowest position of the adjustment lever 470 where the lever 470 is able to reach has been designed to be a predetermined low position. As shown in FIG. 9A, the belt 461 is assumed to be on the right side of the figure. At this time, the adjustment lever 470 rotates downwardly about the rotational axis 470c due to the weight of the adjustment lever 470 and the tension roller 463. The tension roller 463 inclines as shown in FIG. 9A.

When the drive roller 462 rotates and when the belt 461 starts circling, the belt 461 skews in the arrow C direction, and thereby, the pulley 472 is biased by the side edge parts 461s of the belt 461 and moves in the arrow C direction so that a gap D1 is created between pulley 472 and tension roller 463. In addition, the subtensioner 471 is biased by the pulley 472 and moves in the arrow C direction. As the result, a force opposing to the dotted arrow direction is applied to the tension roller 463.

The adjustment lever 470 is biased by the subtensioner 471, rotates about the rotational axis 470c, and reaches a position shown in FIG. 9B. In this state, a rotational axis O2 (center axis of shaft 463a) of the tension roller 463 and a rotational axis O1 (center axis of shaft 462a) of the drive roller 462 become substantially parallel with each other. Therefore, the skew of the belt 461 is stopped, and the belt 461 stably travels.

As the relationship between the driving state of the belt 461 and the inclination of the tension roller 463 is illustrated in FIG. 8, in a state where the tension roller 463 is inclined like shown in FIG. 9A, the belt 461 was affected by a force to move along the arrow C. On the other hand, when the tension roller 463 is driven, another force is applied to the tension roller, which is in the opposite direction from the dotted arrow shown in FIG. 9A. The two forces are canceled, then the tension roller 463 becomes at a horizontal position in FIG. 9B. In order to cancel these two opposite forces and to maintain a horizontal position shown in FIG. 9B, the tension roller 463 and the belt 461 are arranged in a proper manner. More specifically, the arrangement is realized by coordinating shapes and sizes of the parts (specifically the size of the adjustment lever 470 and the angle of the rotational shaft 470c) etc.

On the other hand, as shown in FIG. 9C, when the belt 461 is closer to the left side in the figure, the pulley 472, which is biased by the belt 461, and the subtensioner 471, which is biased by the pulley 472, are positioned on the left side. In addition, the adjustment lever 470 that is biased by the subtensioner 471 rotates in the upward direction about the rotational axis 470c.

When the drive roller 462 rotates and when the belt 461 starts circling, the belt 461 skews in the arrow B direction. The adjustment lever 470 rotates downwardly by contacting the pulley 472 due to the weight of the adjustment lever 470 and the tension roller 463 and reaches the position shown in FIG. 9B. In this state, the rotational axis O2 of the tension roller 463 and the rotational axis O1 of the drive roller 462 become substantially parallel with each other. Therefore, the skew of the belt 461 is stopped, and the belt 461 stably travels.

Next, an operation to reduce the load to the belt 461 in the first embodiment is explained.

FIG. 10 is a schematic diagram illustrating a positional relationship between the belt contact part 471d of the subtensioner 471, the subtensioner 471 and the pulley 472. As shown in FIG. 10, the belt contact part 471d of the subtensioner 471 is on the downstream side of the tension roller 463 in the traveling direction of the belt 461 and is positioned in the vicinity of the tension roller 463. Here, the vicinity of the tension roller 463 may be a distance within ±50% of the radius of the tension roller 463 from the rotational center of the tension roller 463 in the traveling direction of the belt 461 and is at a position to contact the belt 461 (see later-discussed FIG. 12A). In addition, the belt contact part 471d contacts, from the upward direction, the side edge part (edge part in the width direction) of the belt 461 tensioned by the drive roller 462 and the tension roller 463 and deforms the side edge part of the belt 461 in the downward direction (−Z direction, or internal direction of the belt).

The axial direction of the belt contact part 471d inclines by angle θ with respect to the rotational axis O2 of the tension roller 463 as discussed above. In addition, the belt contact part 471d inclines so as to separate away from the belt 461 surface (here upwardly) from the side edge part of the belt 461 to the inside in the width direction. The inclination surface is shown with 471x, which is also angled with θ with respect to the rotational axis O2 in this embodiment. Moreover, the position at which the belt contact part 471d biases the belt 461 is in the vicinity of the tension roller 463 in the downstream side thereof in the moving direction A of the belt 461 (FIG. 3). Even though the reference θ refers to two different angles, in light of the invention, the angle made by the inclination surface 471s and the rotational shaft O2 is not necessarily the same as the angle made by the shaft direction of the belt contact part 471d and the rotational shaft O2.

Therefore, the belt contact part 471d biases the side edge part of the belt 461 in a direction in which the side edge part of the belt 461 is separated from the flange part 472c of the pulley 472. As a result, the flange part 472c and the belt 461 are separated away from each other by a distance d. As such, friction between the flange part 472c and the belt 461 is reduced.

In addition, when the tension roller 463 swings up and down for preventing the skew of the belt 461 (see FIGS. 9A to 9C), the subtensioner 471 is driven by the rotation of the adjustment lever 470 while maintaining the contact state of the belt contact part 471d to the belt 461.

More specifically, when the pulley 472 moves along the shaft 463a of the tension roller 463 in accordance with the skew of the belt 461, the subtensioner 471 moves along the tension roller 463 in accordance with the movement of the pulley 472. In accordance with the movement of the subtensioner 471, the adjustment lever 470 rotates about the rotational axis 470c. At this time, the guide groove 471c of the subtensioner 471 slidably engages with the guide shaft 470b of the adjustment lever 470 (FIG. 6B), and the sleeve 471b of the subtensioner 471 slidably engages with the elongate hole 470a of the adjustment lever 470. Therefore, the subtensioner 471 rotates about the shaft 463a of the tension roller 463 in accordance with the rotation of the adjustment lever 470. As a result, a state in which the belt contact part 471d of the subtensioner 471 biases the belt 461 (as the belt contact part 471d inclines toward the axial direction of the tension roller 463) is maintained.

That is, even if the side edge part of the belt 461 is displaced upwardly and downwardly, furthermore moved right or left along the shaft 463a so that the distance between the tension roller 463 and the pulley 472 is reduced or extended in response to the change in inclination of the tension roller 463 due to the skew of the belt 461, a state, in which the belt contact part 471d of the subtensioner 471 biases the side edge part of the belt 461 in a direction away from the flange part 472c of the pulley 472, is maintained.

FIGS. 11A to 11C are side views schematically illustrating a state of the belt contact part 471d of the subtensioner 471 biasing the belt 461, in connection with the change in inclination of the tension roller 463. FIG. 12A is a top view schematically illustrating a state of the belt contact part 471d of the subtensioner 471 biasing the belt 461.

As shown in FIG. 11A, the belt contact part 471d of the subtensioner 471 contacts the side edge part of the belt 461 from the upward direction and biases the belt 461 downwardly (in the −Z direction) when the belt 461 in horizontal (corresponding to FIG. 9B). At this time, as shown in FIG. 12A, a part 461a of the belt 461 that is biased by the belt contact part 471d is slightly displaced inwardly in the width direction of the belt 461 and is separated away from the pulley 472.

That is, when the belt 461 rotates for about a half outer circumference of the tension roller 463, the side edge surface of the belt 461 travels while contacting the pulley 472. However, when the side edge surface of the belt 461 passes the pulley 472 (more specifically, before completing to pass the pulley 472), the side edge part is separated away from the pulley 472.

As a result, because the side edge part of the belt 461 is separated away from the pulley 472 when the belt 461 passes the pulley 472, the belt 461 temporarily warps due to the frictional force between the side edge part of the belt 461 and the pulley 472. Therefore, a behavior that the belt 461 hops thereafter due to the elasticity of the belt 461 (later-discussed FIGS. 13A to 13C) is prevented.

In addition, as shown in FIG. 11B, when the end part of the tension roller 463 moves downwardly (corresponding to FIG. 9A), the subtensioner 471 rotates downwardly due to the above-discussed engagement of the guide shaft 470b of the adjustment lever 470 and the guide groove 471c of the subtensioner 471, and thereby the belt contact part 471d is displaced downwardly. As a result, the state in which the belt contact part 471d of the subtensioner 471 biases the side edge part of the belt 461 (in the direction away from the pulley 472) is maintained.

Furthermore, as shown in FIG. 11C, when the end part of the tension roller 463 moves upwardly (corresponding to FIG. 9C), the subtensioner 471 rotates upwardly due to the engagement of the guide shaft 470b of the adjustment lever 470 and the guide groove 471c of the subtensioner 471, and thereby the belt contact part 471d is displaced upwardly. Or, the subtensioner 471 moves up and down in correspondence with the up and down movements of the tension roller 463 and the belt 461. As a result, the state in which the belt contact part 471d of the subtensioner 471 biases the side edge part of the belt 461 is maintained.

Operation of a belt unit (belt drive device) that does not include the subtensioner 471 is explained for comparison with the first embodiment.

Figure 13A:
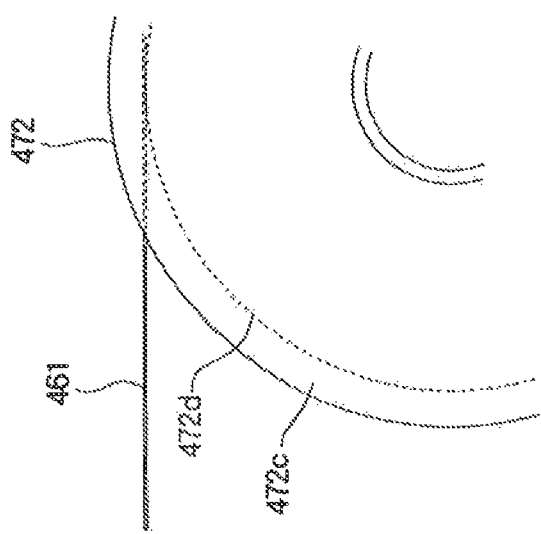
FIGS. 13A-13C are schematic diagrams illustrating behavior of the belt when the subtensioner is not provided.
Figure 13B:
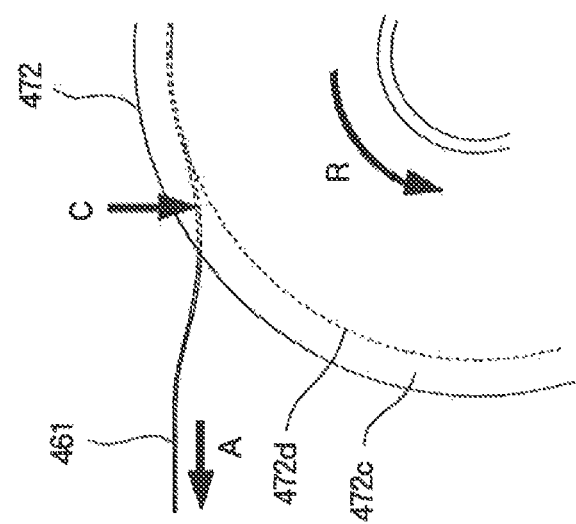
Figure 13C:
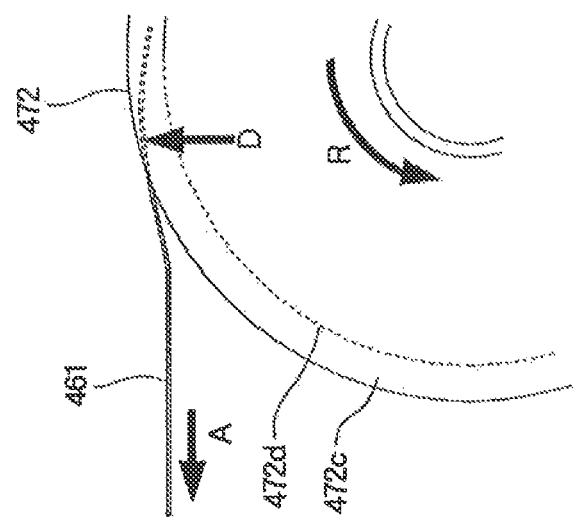

FIG. 12B is a plan view illustrating a part of the belt unit that does not include the subtensioner 471. FIGS. 13A to 13C are side views illustrating the behavior of the belt in the belt unit that does not include the subtensioner 471. The belt unit shown in FIG. 12B and FIGS. 13A to 13C is similar to the belt unit of the first embodiment except that the belt unit does not include the subtensioner 471.

As shown in FIG. 13A, a frictional force acts between the side edge part of the belt 461 and the flange part 472c of the pulley 472 when the belt 461 is stopped. As shown in FIG. 13B, when the belt 461 starts circling in the arrow A direction, the pulley 472 rotates in the arrow R direction due to the frictional force between the belt 461 and the ring part 472d and flange part 472c of the pulley 472. At this time, because the side end part of the belt 461 that contacts the flange part 472c of the pulley 472 is pulled in the rotational direction of the pulley 472 due to the frictional force with the flange part 472c of the pulley 472, the belt 461 is partially warped as shown by arrow C. When the belt 461 further travels from this state, the belt 461 may hop as shown by arrow D due to the elastic force of belt 461 as shown in FIG. 13C.

The change in states shown in FIGS. 13B and 13C is not limited at the beginning of the belt 461 running but may occur while the belt 461 travels. Because the belt 461 travels at high speed, the above-described change in the states occurs at high frequency. Therefore, the wear of the belt 461 may advance.

In contrast, with the belt unit 460 according to the first embodiment, the behavior shown in FIGS. 13B and 13C does not occur because the subtensioner 471 displaces the side edge part of the belt 461 in the direction away from the pulley 472 (that is changes a driving path) when the belt 461 passes the pulley 472. Therefore, there is an advantage that the life of the belt 461 is extended as the load to the belt 461 is reduced.

As explained above, according to the first embodiment of the present invention, the subtensioner 471 positioned on the upstream side of the tension roller 463 in the traveling direction of the belt 461 displaces the side edge part of the belt 461 to separate away from the pulley 472. Therefore, the load, such as the applied force, the frictional force and the like, applied to the force belt 461 is reduced. Therefore, the life of the belt 461 and the belt unit 460 is extended.

In particular, even if the inclination of the tension roller 463 changes, the state in which the belt contact part 471d of the subtensioner 471 biases the side edge part of the belt 461 is maintained. Therefore, the load of the belt 461 is reduced in the belt unit 460 that includes a configuration to prevent the skew of the belt 461.

Figure 14:
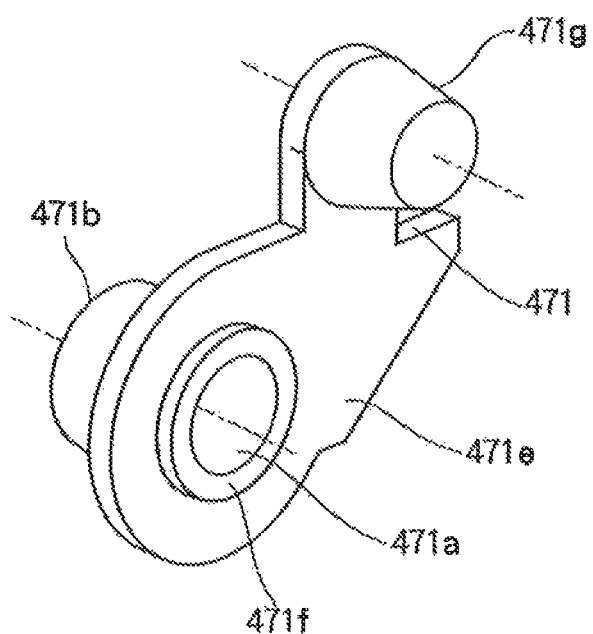
FIG. 14 is a perspective view of a modification example of the subtensioner according to the first embodiment of the present invention.

Here, the belt contact part 471d is cylindrical, and the axial direction of the belt contact part 471d is inclined with respect to the surface of the belt 461. However, as shown in FIG. 14, the belt contact part may be formed in a cone shape (see numeral 471g) in which the outer diameter is reduces towards the center part of the belt 461 in the width direction. In this case, the axial direction of the belt contact part 471g is parallel with the surface of the belt 461. In addition, the belt contact part 471d is not limited to the cylindrical or conical shape. However, the belt contact part 471 may be in any shape that contacts the belt 461 at a surface (or contact surface) that inclines with respect to the surface of the belt 461.

Second Embodiment

Next, a second embodiment of the present invention is explained. The configuration of the subtensioner in the second embodiment is different from that in the first embodiment. Other configurations are the same as those in the first embodiment.

FIGS. 15A and 15B are a perspective view and an exploded perspective view, respectively, of a configuration of a subtensioner 473 according to the second embodiment. Similar to the subtensioner 471 of the first embodiment, the subtensioner 473 includes the shaft hole part 471a, the sleeve 471b, the guide groove 471c and the base part 471e. However, the subtensioner 473 includes a shaft part 474a, a roller 475 (or roller member) and a snap ring 476, instead of the belt contact part 471d of the subtensioner 471 of the first embodiment.

That is, the shaft part 474a that protrudes in a direction inclined with respect to the surface of the belt 461 (more specifically, the direction that inclines with respect to the axial direction of the tension roller 463) is formed on the base part 471e. The roller 475 is rotatably mounted on the shaft part 474a. A groove 474b is formed at the front end of the shaft part 474a. The snap ring 476 that holds and prevents the roller 475 from falling is mounted on the groove 474b.

Figure 16A:
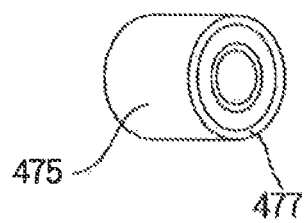
FIGS. 16A and 16B are perspective views of a modification example of a roller part of the subtensioner according to the second embodiment.

The roller 475 is preferably configured from a material excellent in slidability. However, as shown in FIG. 16A, for example, a high frictional coefficient member 477, such as a rubber and the like, may be provided on the surface of the roller 475 to suppress the slides with the belt 461 and the invasion to the belt 461.

Figure 16B:
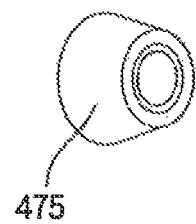

In addition, here, the roller 475 is cylindrical, and the axial direction of the roller 475 is inclined with respect to the surface of the belt 461. However, as shown in FIG. 16B, the roller 475 may be formed in a cone shape in which the outer diameter is reduces towards the center part of the belt 461 in the width direction. In this case, the axial direction of the roller 475 is parallel with the surface of the belt 461.

In the second embodiment, the side edge part of the belt 461 is biased in the direction away from the pulley 472 (that is, towards the center part in the width direction of the belt 461) as the rotatable roller 475 contacts the side edge part of the belt 461. Because the roller 475 rotates in accordance with the driving (or running) of the belt 461, wear due to the friction of the belt 461 is suppressed.

As explained above, according to the second embodiment of the present invention, in addition to the advantages explained in the first embodiment, the roller 475 (belt contact part) that displaces side edge part of the belt 461 by contacting the side edge part of the belt 461 is rotatable in accordance with the driving of the belt 461. Therefore, wear of the belt 461 and the roller 475 is suppressed.

In addition, in each of the above-discussed embodiments, the pulley 472 and the subtensioner 471 (473) are provided on one end of the tension roller 463. However, the pulley 472 and the subtensioner 471 (473) may be provided on both ends of the tension roller 463 and/or on a plurality of rollers.

Moreover, in each of the above-discussed embodiments, an image forming apparatus was explained that directly transfers a developer image from a process unit onto a recording medium carried by the belt. However, the embodiments are not limited to such image forming apparatus. For example, the image forming apparatus may include an intermediate transfer belt. In that case, the developer image is transferred from the process unit to the intermediate transfer belt and then from the intermediate transfer belt to the recording medium. The belt driving device (belt unit) of each of the above-discussed embodiments may be used as the belt driving device that drives the intermediate belt.

Moreover, the present invention is not limited to an image forming apparatus that forms a color image but may be adapted to an image forming apparatus that forms a single color image. Furthermore, the present invention is not limited to a printer but may be adapted to an apparatus that performs image processes to the recording medium by using a belt, such as a copy machine, a facsimile device, an automatic document reader and the like.

In the invention, the inclination surface, for example inclination surface 471x, is not necessarily configured in a straight line. It might be form with a gradually curved line (convex or concave) as long as the side edge part of the belt can smoothly glide on the surface.

What is claimed is:

1. A belt driving device that drives a belt, comprising:
a plurality of rollers;
an endless belt tensioned on the plurality of rollers;
a belt guide member that is mounted on at least one end of at least one roller of the plurality of rollers and that guides a side edge part of the belt; and
a belt displacement device that is mounted on the same end of the one roller as the belt guide member in order to displace the side edge part of the belt in a direction away from the belt guide member, wherein
a portion of the belt displacement device is located on a downstream side of the belt guide member in a traveling direction of the belt, and
the portion continuously contacts the side edge part of the belt.

2. The belt driving device according to claim 1, wherein
the one roller is supported to be pivotably movable around the other end of the one roller on which the belt guide member and the belt displacement device are not disposed so that an inclination thereof varies, and
the portion of the belt displacement device changes a position thereof in response to the change in the inclination of the one roller.

3. The belt driving device according to claim 1, wherein
the portion of the belt displacement device is configured with an inclination surface that inclines with respect to a surface of the belt and biases the side edge part of the belt by the inclination surface.

4. The belt driving device according to claim 2, wherein
the portion of the belt displacement device is configured with an inclination surface that inclines with respect to a surface of the belt and biases the side edge part of the belt by the inclination surface.

5. The belt driving device according to claim 1, wherein
the portion of the belt displacement device is a belt contact part that is positioned at a distance within ±50% of a radius of the one roller from the rotational center thereof in the traveling direction of the belt.

6. The belt driving device according to claim 1, wherein
the portion of the belt displacement device is a belt contact part that contacts the side edge part of the belt and deforms the side edge part of the belt 461 in an internal direction of the belt.

7. The belt driving device according to claim 1, wherein
the portion of the belt displacement device is configured with a roller member that contacts the side edge part of the belt and that is rotatable in accordance with the driving of the belt.

8. The belt driving device according to claim 7, wherein
an outer diameter of the roller member is reduced in a direction from the side edge part of the belt towards a center part in a width direction of the belt.

9. The belt driving device according to claim 7, wherein
the roller member includes a high frictional coefficient member on outer circumference thereof.

10. The belt driving device according to claim 1, wherein
the belt guide member is a pulley that is mounted on an end of a shaft of the one roller and that is movable along the shaft.

11. The belt driving device according to claim 10, wherein
the belt displacement device is mounted outside the pulley on the end of the shaft of the one roller so as to be movable along the shaft.

12. The belt driving device according to claim 11, further comprising:
a roller shaft displacement device that is mounted outerside the belt displacement device on the end of the shaft of the one roller and that displaces the end of the shaft in response to a skew state of the belt, wherein
the belt displacement device moves in accordance with the roller shaft displacement device.

13. The belt driving device according to claim 1, wherein
the belt guide member is a flange that is mounted on an end of a shaft of the one roller and that is movable along the shaft.

14. The belt driving device according to claim 13,
the flange includes an inclination surface on an outer circumference thereof, the inclination surface inclining with respect to the shaft of the one roller in order to guide the side edge part of the belt inwardly.

15. An image forming apparatus, comprising:
the belt driving device according to claim 1; and
an image forming part that forms an image on either a surface of a recording medium, which is carried by the belt of the belt driving device, or a surface of the belt.

* * * * *